3 Sheets—Sheet 1.

O. C. WHITE.

DENTISTS' CHAIRS.

No. 7,223. Reissued July 11, 1876.

WITNESSES

Wm. A. Skinkle

F. Stich

INVENTOR

Otis C White

By Attorney

W. D. Baldwin

N. PETERS, PHOTO-LITHOGRAPHER, WASHINGTON, D. C.

O. C. WHITE.

DENTISTS' CHAIRS.

No. 7,223. Reissued July 11, 1876.

*WITNESSES*

Wm A Skinkle

F Stich

*INVENTOR*

Otis C White

*By his Attorney*

Wm. Baldwin

N. PETERS, PHOTO-LITHOGRAPHER, WASHINGTON, D. C.

3 Sheets—Sheet 3.

O. C. WHITE.

DENTISTS' CHAIRS.

No. 7,223. Reissued July 11, 1876.

WITNESSES

Wm A Skinkle

F. Stich

INVENTOR

Otis C White.

By his Attorney

Wm D. Baldwin

N. PETERS, PHOTO-LITHOGRAPHER, WASHINGTON, D. C.

UNITED STATES PATENT OFFICE.

OTIS C. WHITE, OF HOPKINTON, MASSACHUSETTS, ASSIGNOR TO SAMUEL S. WHITE, OF PHILADELPHIA, PENNSYLVANIA.

IMPROVEMENT IN DENTISTS' CHAIRS.

Specification forming part of Letters Patent No. 130,093, dated July 30, 1872; reissue No. 7,223, dated July 11, 1876; application filed March 22, 1876.

*To all whom it may concern:*

Be it known that I, OTIS C. WHITE, of Hopkinton, in the county of Middlesex and State of Massachusetts, have invented certain new and useful Improvements in Dentists' Chairs, of which the following is a specification:

My invention relates to an organization of mechanism for raising and lowering a chair proper upon its base, for adjusting and retaining the chair at the inclination desired, for adjusting the foot-rest with reference to the seat or seat-frame, and for varying the inclination of the seat relatively to its seat-frame and back.

The subject-matter claimed hereinafter will be specified.

Figure 1:
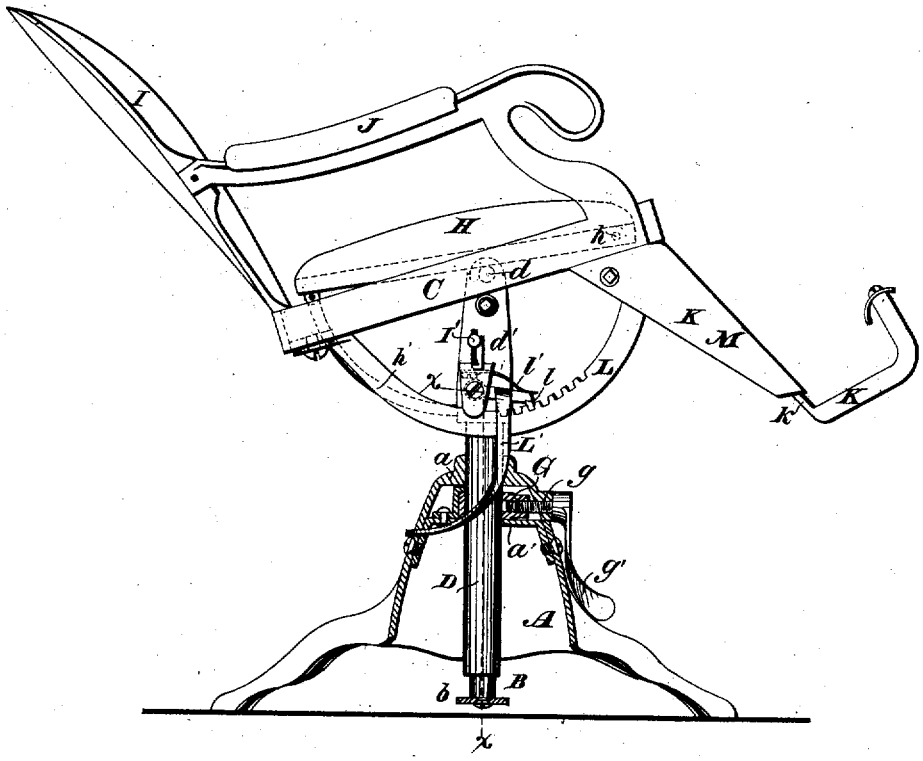
Figure 2:
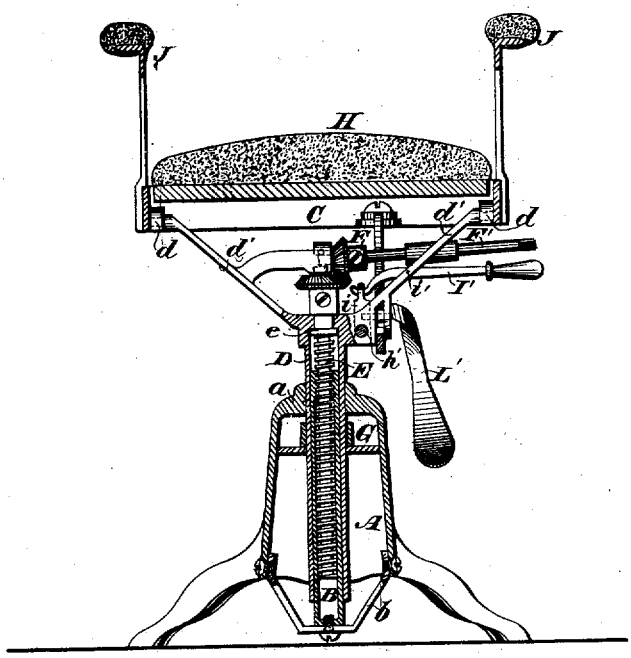
Figure 3:
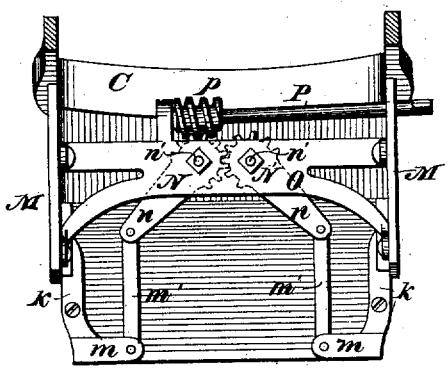
Figure 4:
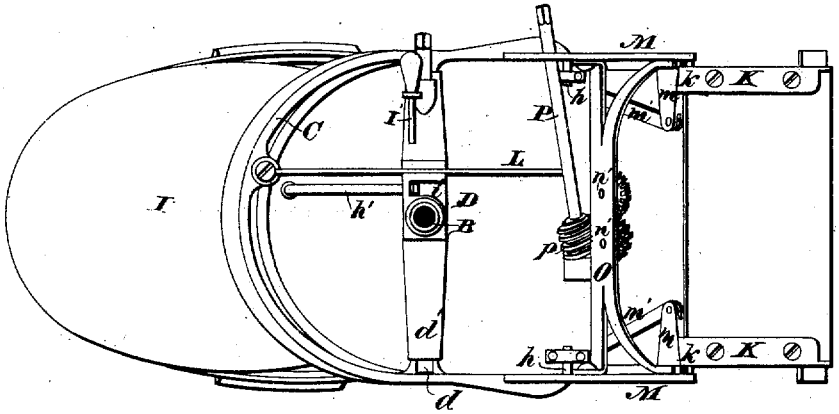

In the accompanying drawings, which show a chair embodying all my improvements, Figure 1 represents a side elevation; Fig. 2, a vertical transverse cross-section therethrough, on the line *x x* of Fig. 1. Fig. 3 shows a detail view of the foot-rest mechanism detached, and Fig. 4 a bottom-plan view of the chair with the base or stool removed.

The base or stool A is made open at its center to receive a fixed internally-threaded tube, B, the lower end of which rests upon a step or support, *b*, while its upper end passes through an opening in the upper portion *a* of the base or stool. The frame C of the chair rocks upon pivots *d* of two arms, *d'*, extending from a sleeve, D, which slides and turns freely on the threaded tube B, passing through an opening in the stool, and in a guide plate or collar, *a'*, in the stool-body. A screw or spindle, E, working inside of the threaded tube, passes through the sleeve D above mentioned, and is provided at its upper end with a collar, *e*, over which a bevel-wheel, E', is mounted, and which is driven by a corresponding bevel-gear, F, on a winch-shaft, F', by which mode of construction the rotation of the screw-spindle in the stationary threaded tube B will raise or lower the chair, according to the direction in which the spindle is turned.

By the method of construction above described, I am enabled not only to conceal the lifting-screw, but to give a firm support to the seat laterally by means of the sleeve D, which insures the free rotation of the screw-spindle at all times by preventing its binding or strain. The sleeve D turns freely in its bearings to permit the chair to face in any direction. In order to retain the seat in any desired elevation or fasten it in any desired position, I employ a clamp-ring, G, provided with a set-screw, *g*, working in a nut-thread in said ring, and provided with an arm or crank, *g'*, so located that it can freely be moved by the foot of the operator, who can thus tighten the ring against the sleeve, and thereby fasten it and the chair in position, or loosen the ring, allowing the sleeve and chair-seat to be turned or raised and lowered. The seat H, the back I, and the arms J J are secured upon the chair-frame, as well as a foot-rest secured upon bars pendent therefrom. The chair-frame rocks freely on its pivots *d* above mentioned, and is held in any desired position by means of a curved rack, L, secured underneath the frame, and controlled by means of a rocking pawl, *l*, held in gear with the rack by a suitable spring, *l'*, and released therefrom by means of a crank-arm or foot-treadle, L', located beneath the chair in a position where it can readily be reached by the operator's foot.

It is often desirable to maintain the seat proper in a horizontal position when the chair-frame is tipped, or that it shall not be tipped as much as the frame. To provide for such relative movements or positions of the seat and frame, the seat proper is pivoted to the frame at *h*, and is controlled by means of a curved rod or bar, *h'*, secured to the rear end of the seat, and passing through a bearing on the chair-frame, this bar being controlled by means of a stop, *i*, jointed to the inner arm of a lever, I', pivoted at *i'*, the outer arm of which lever extends out to the side of the chair, so that the operator, by drawing it up, can throw down the stop, which prevents the rod from moving forward with the rack, and the rear side of the seat from moving. By forming teeth on the rod *h'* the angle of the seat may be regulated by throwing the stop above mentioned into connection with any part of said teeth. The foot-rest frame, instead of being immovably attached to the seat-frame, is made capable of vertical movement and adjustment as follows: The end bars K, which connect the foot-rest with the seat-frame, are provided with guide-bars *k*, which slide in grooves on the inner side of the frame-pieces M, and are provided with ears *m*, connected by links *m'* with arms *n*, projecting from segmental gears N N', pivoted by pins *n'* to a cross bar or plate, O. The two gears mesh with each other, and one of them engages with a screw or worm, *p*, on a shaft, P, the turning of which raises or lowers the foot-rest as the rotation of the shaft turns the segments, and thereby flexes the links, raising or lowering the foot-rest, which remains in whatever position it may be brought. The front end of the foot-rest is provided with a foot-bar, and each of the end pieces of the foot-rest is made to embrace the bar-supports, the slides, and the ears in one casting.

By these means a dentist's chair is made with all desirable provisions as to adjustment, the means of manipulation being very simple, and such as may be freely used with ease and facility without disturbance or annoyance of the patient occupying the chair.

I claim as of my invention and desire to secure by Letters Patent—

1. The combination, substantially as hereinbefore set forth, of the base, the internally-threaded stationary tube, and the step or plate upon which it is mounted.

2. The combination, substantially as hereinbefore set forth, of the base, the internally-threaded tube, and the lifting screw or spindle, whereby the screw is protected throughout its entire length.

3. The combination, substantially as hereinbefore set forth, of the internally-threaded tube, the screw-shaft rotating therein, and the sliding sleeve encompassing both the tube and shaft.

4. The combination, substantially as hereinbefore set forth, of the base, the internally-threaded tube, the sliding sleeve upon which the chair is mounted, enveloping the tube, and the supporting-collar in the base, through which the sleeve passes to steady it.

5. The combination, substantially as hereinbefore set forth, of the base, the internally-threaded tube, the sliding sleeve inclosing the tube, and a clamp which locks them in position.

6. The combination, substantially as hereinbefore set forth, of the sliding sleeve, its inclosed screw-spindle, and the clamp-ring, screw, and arm acting upon the sliding sleeve.

7. The combination, substantially as hereinbefore set forth, of the tilting chair-frame, the seat pivoted thereto, and its adjusting-bar and stop, whereby the seat may be adjusted independently of the chair-frame.

8. The combination, substantially as hereinbefore set forth, of the chair-frame, its pendent arms, the adjustable foot-rest frame, moving in guides in said pendent arms, the adjusting-gears, and the link-connections.

9. The dentist-chair hereinbefore described, consisting of the combination of a base, a central tube, an elevating-screw, an enveloping sliding sleeve, a tilting seat-frame, and an adjustable foot-rest.

OTIS C. WHITE.

Witnesses:

A. EVARTS CLAFLIN,
CLEMENT MESERVE.